United States Patent
Wu et al.

(10) Patent No.: US 7,218,230 B2
(45) Date of Patent: May 15, 2007

(54) MULTI-DIMENSIONAL ANTENNA IN RFID SYSTEM FOR READING TAGS AND ORIENTATING MULTI-DIMENSIONAL OBJECTS

(75) Inventors: Ming-Che Wu, Hsinchu (TW); Tien-Fa Hou, HsinChu (TW)

(73) Assignee: G-Time Electronic Co., Ltd., Taipei (TW)

( * ) Notice: Subject to any disclaimer, the term of this patent is extended or adjusted under 35 U.S.C. 154(b) by 218 days.

(21) Appl. No.: 11/118,212

(22) Filed: Apr. 29, 2005

(65) Prior Publication Data

US 2006/0197669 A1    Sep. 7, 2006

Related U.S. Application Data

(63) Continuation-in-part of application No. 11/062,815, filed on Feb. 23, 2005.

(51) Int. Cl.
*G08B 13/14* (2006.01)

(52) U.S. Cl. .............................. 340/572.1; 340/572.4; 340/572.7; 340/10.1; 340/10.3; 340/10.51; 343/883; 700/214

(58) Field of Classification Search ............ 340/572.1, 340/572.4, 572.7, 572.8, 10.1, 10.3, 10.51, 340/825.49, 825.69, 825.72; 343/711, 883; 700/213, 214

See application file for complete search history.

(56) References Cited

U.S. PATENT DOCUMENTS

| | | | | |
|---|---|---|---|---|
| 5,439,221 A | * | 8/1995 | Harvie | .................. 273/157 R |
| 6,825,816 B2 | * | 11/2004 | Aikawa et al. | ............. 343/770 |
| 7,155,304 B1 | * | 12/2006 | Charych | ..................... 700/214 |

* cited by examiner

*Primary Examiner*—Hung Nguyen

(57) ABSTRACT

A RFID system applying to a three-dimensional jigsaw is provided. The RFID system includes a jigsaw substrate having a plurality of blocks, a plurality of jigsaw units corresponding to each blocks of the jigsaw substrate, a RFID reader having a plurality of antennas positioned in a position of each blocks of the jigsaw substrate, and a plurality of tags positioned in a position of each face of a three-dimensional jigsaw unit corresponding to the positions of the antennas, wherein the RFID reader communicates to the tags using modulated radio signals through the antennas and the tags respond with modulated radio signals in order to determine whether the orientation of the three-dimensional jigsaw unit is correct or not.

20 Claims, 6 Drawing Sheets

MULTI-DIMENSIONAL ANTENNA IN RFID SYSTEM FOR READING TAGS AND ORIENTATING MULTI-DIMENSIONAL OBJECTS

CROSS-REFERENCE TO RELATED APPLICATIONS

This is a continuation-in-part application that claims the benefit of priority under 35 U.S.C. s.119 to a non-provisional application, application Ser. No. 11/062,815, filed Feb. 23, 2005.

BACKGROUND OF THE PRESENT INVENTION

1. Field of Invention

The present invention relates to a radio frequency identification (RFID) reader using a plurality of antennas for reading data from Tags, and more particularly to a RFID reader using a plurality of antennas applied to multi-dimensional objects, such as three-dimensional jigsaw with multimedia sound and light effect, to distinguish the orientation of the three-dimensional jigsaw unit between right and wrong.

2. Description of Related Arts

Radio Frequency Identification (RFID) systems are used for identification and/or tracking of equipment, inventory, or living things. RFID systems are radio communication systems that communicate between a radio transceiver, called a RFID reader, and a number of inexpensive devices called Tags or transponders. In RFID systems, the RFID reader communicates to the Tags using modulated radio signals, and the Tags respond with modulated radio signals. Conventional RFID systems are designed a) to identify an object passing into range of the RFID reader, and b) to store data onto the Tag and then retrieve that data from the Tag at a later time in order to manage inventory or perform some other useful application. In this application, the transmit and receive antennas have the same bandwidth. In fact, transmit and receive frequently share the same antenna, using a circulator to separate the transmit and receive paths.

As described in the U.S. patent application Ser. No. 11/062,815, filed on Feb. 23, 2005, a radio frequency identification (RFID) reader comprising a plurality of antennas could be applied to multi-dimensional objects, such as three-dimensional jigsaw with multimedia sound and light effect, Monopoly board game, . . . etc. However, in this prior art each of antennas in the RFID reader is positioned in a central region of each plane of multi-dimensional objects such as three-dimensional jigsaw. In order for the RFID reader to sense the identifier, the polarizations of the electromagnetic fields generated by the antennas in the RFID reader and Tag must be aligned. In most real-world implementations, however, the orientation of the Tag, and, hence, the polarization of the field generated by the Tag's antenna, is unknown. Therefore, the RFID reader could not distinguish the orientation of the three-dimensional jigsaw unit between right and wrong because the modulated radio signals are non-direction signals. In other words, the RFID reader could not distinguish the orientation of the three-dimensional jigsaw unit between right and wrong even though the three-dimensional jigsaw unit aims at the right position. Therefore, there is a need in the art for a RFID reader that can read Tags and also distinguish the Tags' orientations.

SUMMARY OF THE PRESENT INVENTION

A main object of the present invention is to provide a RFID reader using a plurality of antennas applied to multi-dimensional objects, wherein the antennas are positioned in any particular position in order to distinguish the orientation of multi-dimensional objects.

Another object of the present invention is to provide a RFID reader using a plurality of antennas applied to multi-dimensional objects, such as three-dimensional jigsaw with multimedia sound and light effect, to distinguish the orientation of the three-dimensional jigsaw unit between right and wrong.

Another object of the present invention is to provide a simple and easy way to position Tags and antennas in particular positions in order to distinguish the orientation of multi-dimensional objects.

Accordingly, in order to accomplish the one or some or all above objects, the present invention provides a RFID system applying to a three-dimensional jigsaw, comprising:

a jigsaw substrate having a plurality of blocks;

a plurality of jigsaw units corresponding to each blocks of the jigsaw substrate;

a RFID reader having a plurality of antennas positioned in a position of each blocks of the jigsaw substrate; and a plurality of tags positioned in a position of each face of a three-dimensional jigsaw unit corresponding to the positions of the antennas, wherein the RFID reader communicates to the tags using modulated radio signals through the antennas and the tags respond with modulated radio signals in order to determine whether the orientation of the three-dimensional jigsaw unit is correct or not.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

DETAILED DESCRIPTION OF THE PREFERRED EMBODIMENT

In the following detailed description of the preferred embodiments, reference is made to the accompanying drawings which form a part hereof, and in which is shown by way of illustration specific embodiments in which the invention may be practiced. In this regard, directional terminology, such as "top," "left," "right," "bottom," etc., is used with reference to the orientation of the Figure(s) being described. As such, the directional terminology is used for purposes of illustration and is in no way limiting. It is to be understood that other embodiments may be utilized and structural or logical changes may be made without departing from the scope of the present invention.

Figure 1A:
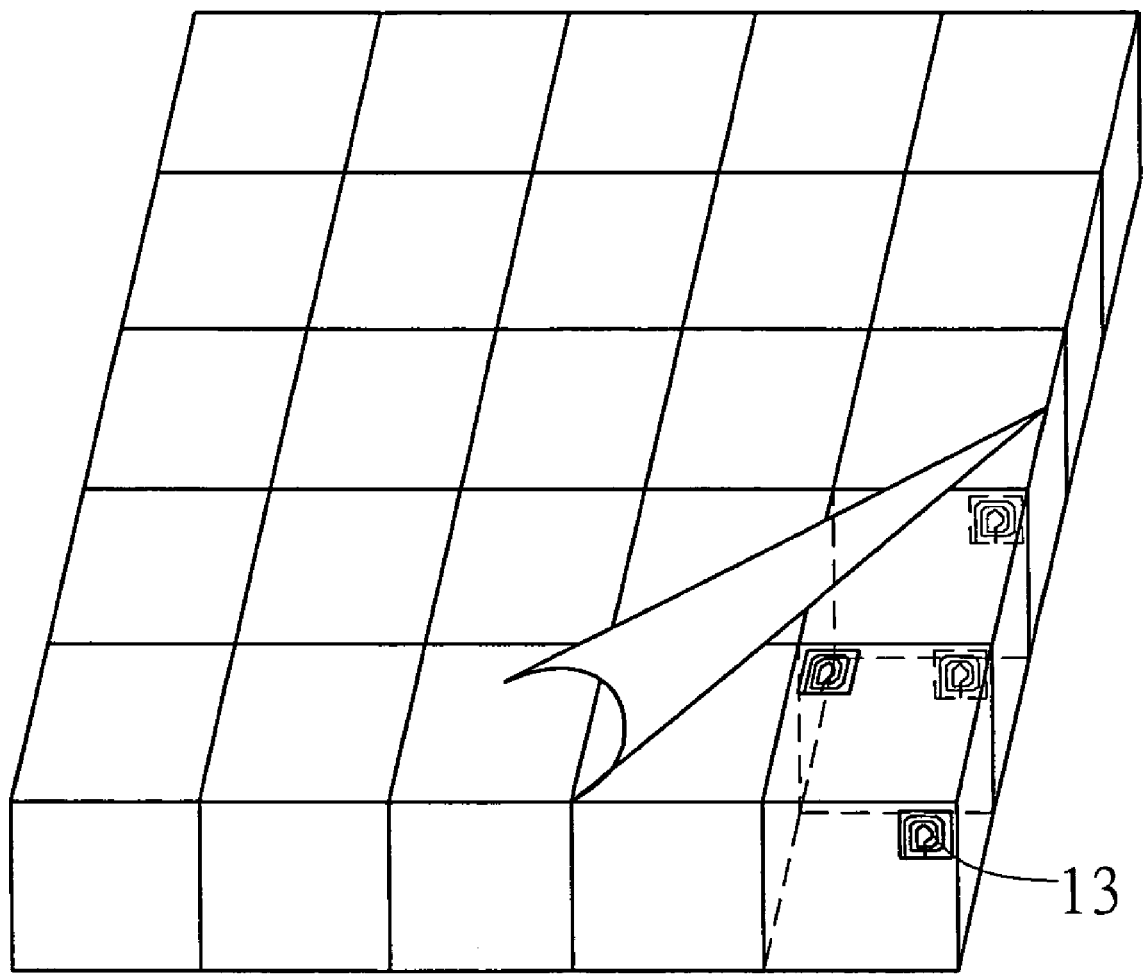
FIGS. 1A–1C are a schematic diagram of a three-dimensional jigsaw utilizing RFID technology to distinguish the orientation of the multi-dimensional objects between right and wrong according to a preferred embodiment of the present invention.

Since the U.S. patent application Ser. No. 11/062,815, filed on Feb. 23, 2005, which discloses a RFID reader having a multi-dimensional antenna array, description thereof is not to be further detailed herein. Please Refer to FIGS. 1A–1C, which show a schematic diagram of a three-dimensional jigsaw utilizing RFID technology to distinguish the orientation of the multi-dimensional objects between right and wrong according to a preferred embodiment of the present invention. Referring to FIG. 1A, the RFID Tags are positioned in any corner of each face of each three-dimensional jigsaw unit.

Figure 1B:
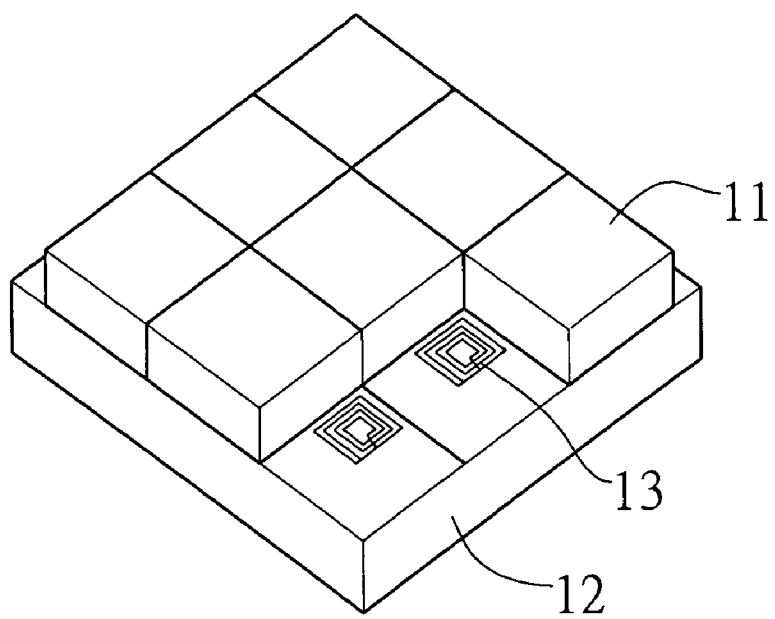

FIG. 1B shows a jigsaw substrate 12 comprising a multi-dimensional antenna array which is positioned in the jigsaw substrate 12. As shown in FIG. 1B, the antenna array comprises a plurality of antennas 13. The antennas 13 are positioned in left-top corners of each block of the jigsaw substrate 12. Nevertheless, antennas 13 are not limited to position in the left-top corner of each block of the jigsaw substrate 12. Actually, antennas 13 could be positioned in any position of each block of the jigsaw substrate 12, which can distinguish the orientation of the three-dimensional jigsaw unit between right and wrong.

Figure 1C:
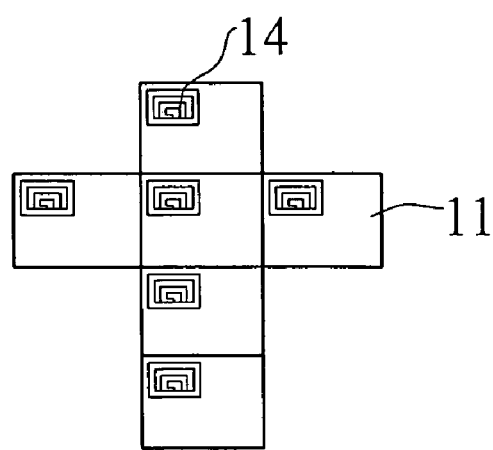

FIG. 1C shows an unfolded planar view of a three-dimensional jigsaw unit 11. As shown in FIG. 1C, RFID Tags 14 are positioned in left-top corners of each face of a three-dimensional jigsaw unit. Nevertheless, RFID Tags 14 are not limited to position in the left-top corner of each face of a three-dimensional jigsaw unit. Actually, RFID Tags 14 could be positioned in any position of each face of a three-dimensional jigsaw unit corresponding to the positions of the antennas, which can distinguish the orientation of the three-dimensional jigsaw unit between right and wrong.

Therefore, the present invention could utilize the above-described structure to distinguish the orientation of a three-dimensional jigsaw unit between right and wrong because the RFID reader communicates to the Tags using modulated radio signals through the antennas 13 and the Tags respond with modulated radio signals. When a three-dimensional jigsaw unit is put on one position of the jigsaw substrate 12, the RFID reader communicates to the Tags using modulated radio signals through the antennas 13 and the Tags respond with modulated radio signals to determined the three-dimensional jigsaw unit between right and wrong. Besides, the positions of the Tag and the antenna also help to distinguish the orientation of the three-dimensional jigsaw unit between right and wrong. In conclusion, the present invention could provide a simple way to determine whether the orientation of the three-dimensional jigsaw unit is correct or not. However, the identification procedure could utilize the scanning technology disclosed in the U.S. patent application Ser. No. 11/062,815, and hence description thereof is not to be further detailed herein.

Figure 2A:
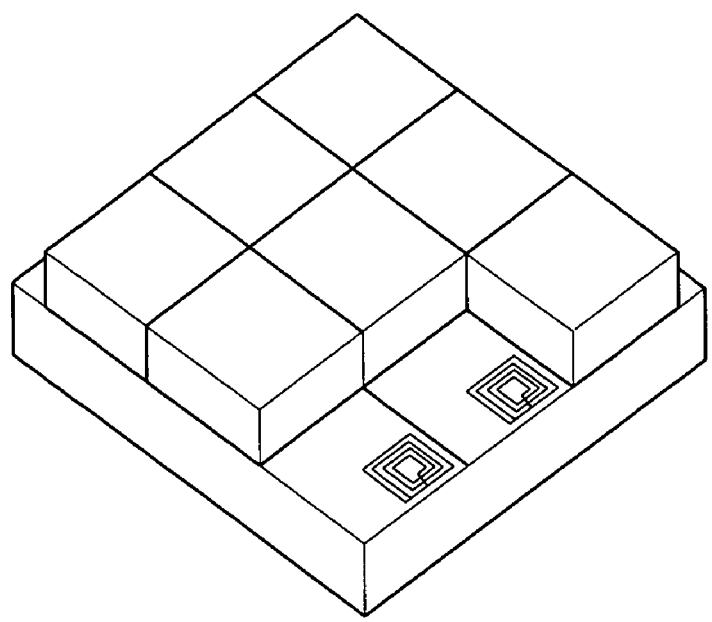
FIGS. 2A–2B are a schematic diagram of a three-dimensional jigsaw utilizing RFID technology to distinguish the orientation of the multi-dimensional objects between right and wrong according to an alternative mode of the above preferred embodiment of the present invention.
Figure 2B:
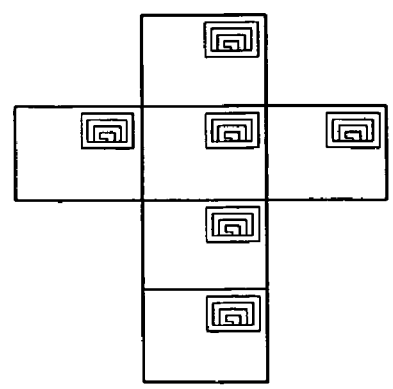

Please Refer to FIGS. 2A–2B, which show a schematic diagram of a three-dimensional jigsaw utilizing RFID technology to distinguish the orientation of the multi-dimensional objects between right and wrong according to an alternative mode of the above preferred embodiment of the present invention.

Figure 3A:
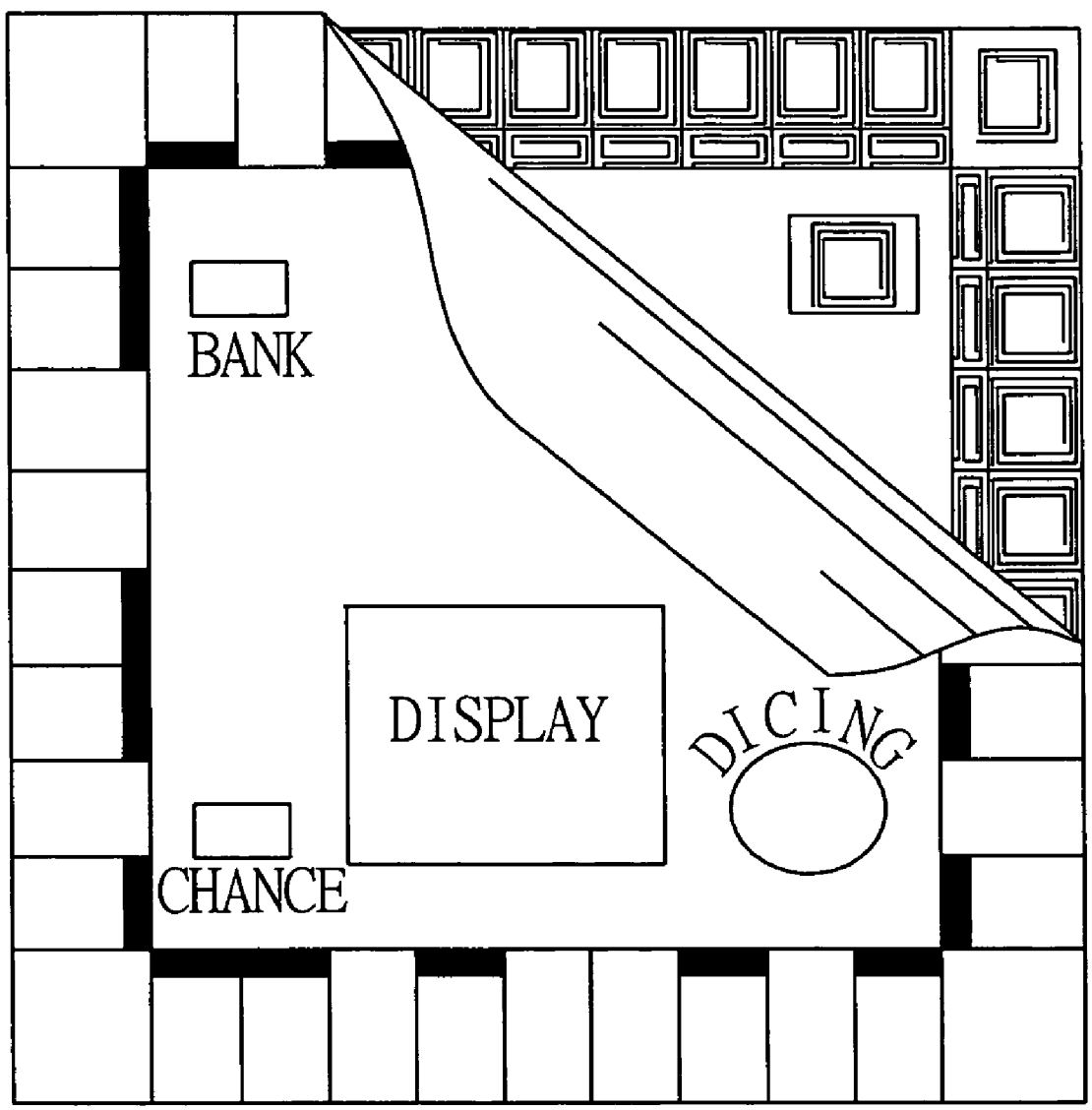
FIGS. 3A–3C are a schematic diagram of a Monopoly board game utilizing RFID technology to distinguish the orientation of the multi-dimensional objects between right and wrong according to a preferred embodiment of the present invention.
Figure 3B:
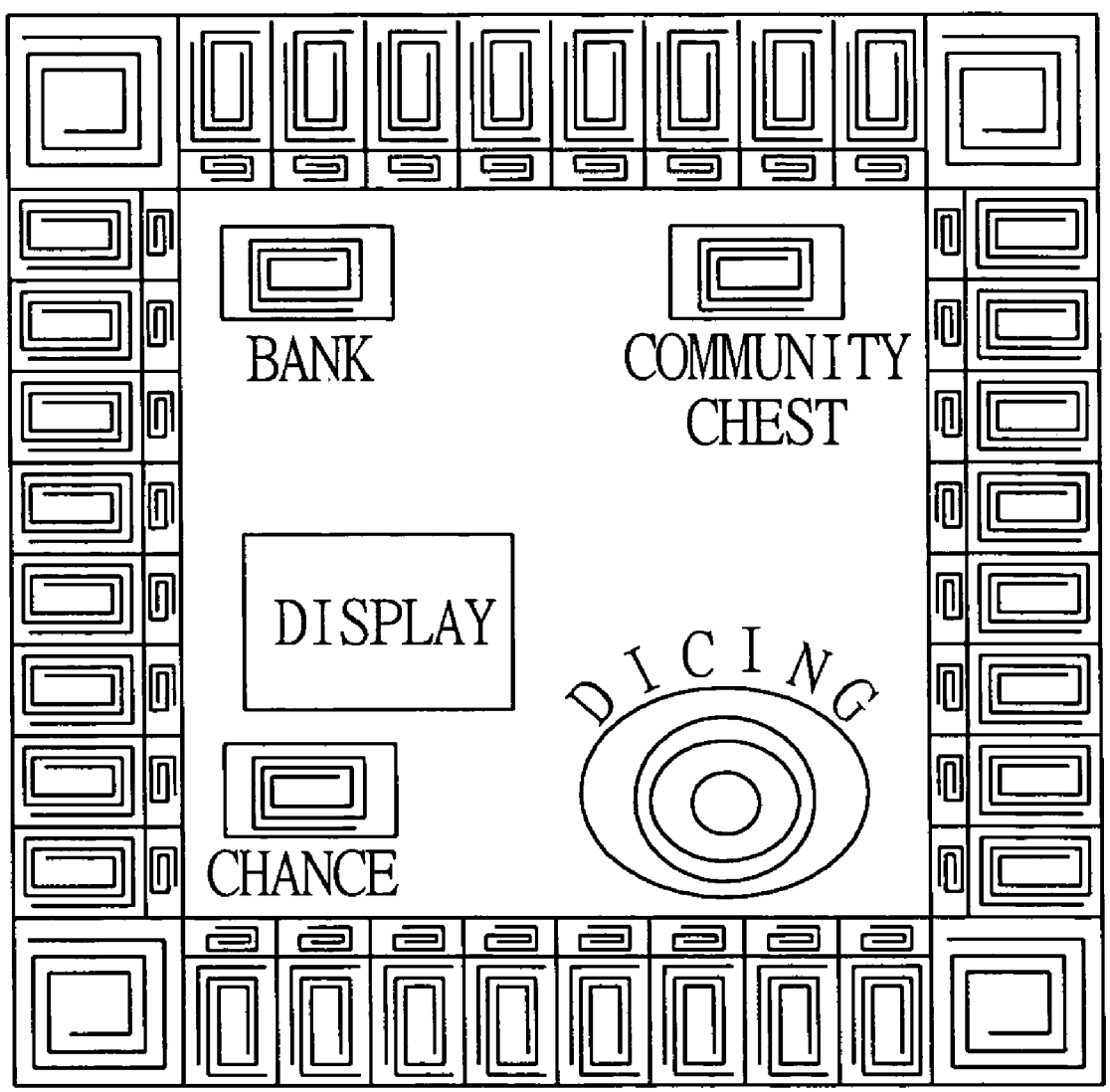
Figure 3C:
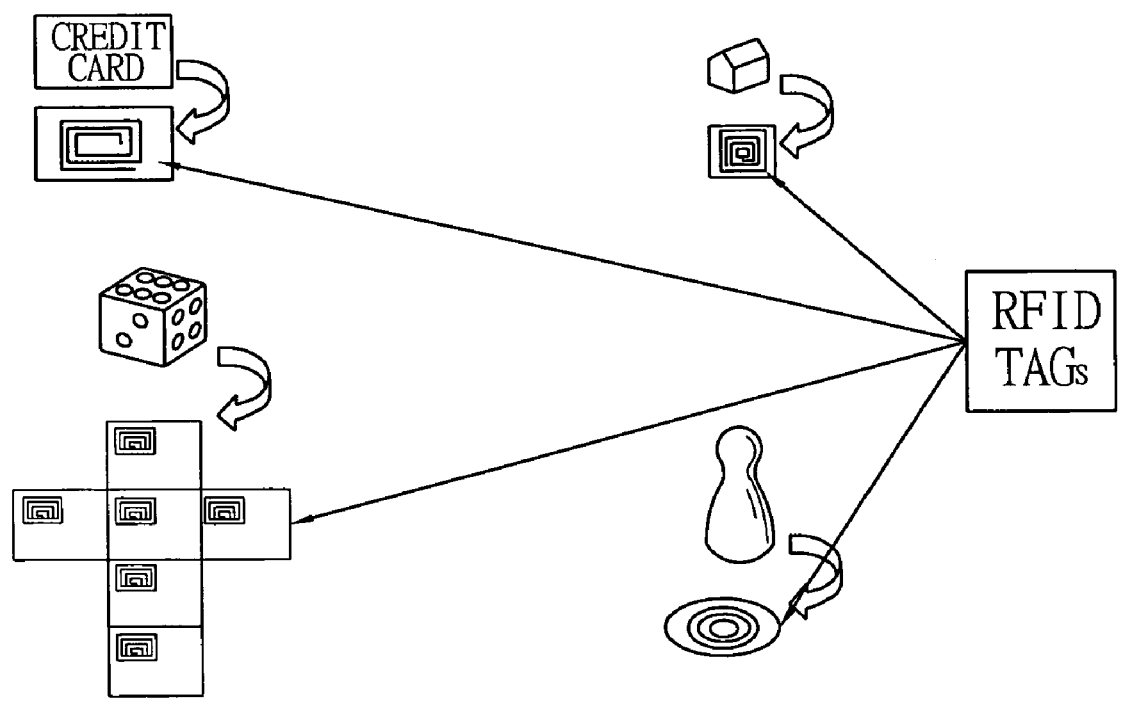

FIGS. 3A–3C are a schematic diagram of a Monopoly board game utilizing RFID technology to distinguish the orientation of the multi-dimensional objects between right and wrong according to a preferred embodiment of the present invention. Please refer to FIGS. 3A–3B, which shows a substrate of a Monopoly board game comprising an antenna array. FIG. 3C shows a multi-dimensional objects of a Monopoly board game, such as a dice, a credit card, and a piece comprising Tags. Therefore, the identification procedure could utilize the scanning technology disclosed in the U.S. patent application Ser. No. 11/062,815 to know the position of the pieces, the pip of the dice. In this present invention, one player just needs a credit card without using a lot of chips because the Monopoly board game can utilize RFID technology to calculate the present chips of the player.

One skilled in the art will understand that the embodiment of the present invention as shown in the drawings and described above is exemplary only and not intended to be limiting.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A RFID system applying to a three-dimensional jigsaw, comprising:
    a jigsaw substrate having a plurality of blocks;
    a plurality of jigsaw units corresponding to each of said blocks of said jigsaw substrate;
    a RFID reader having a plurality of antennas respectively positioned in positions of said blocks of said jigsaw substrate; and
    a plurality of tags respectively positioned in positions of faces of a three-dimensional jigsaw unit corresponding to said positions of said antennas in order to determine whether an orientation of said three-dimensional jigsaw unit is correct or not.

2. The RFID system, as recited in claim 1, wherein said position of each blocks of said jigsaw substrate is a corner of each blocks of said jigsaw substrate.

3. The RFID system, as recited in claim 1, wherein said antennas positioned in a left-top corner of each blocks of said jigsaw substrate.

4. The RFID system, as recited in claim 1, wherein said antennas positioned in a right-top corner of each blocks of said jigsaw substrate.

5. The RFID system, as recited in claim 1, wherein said antennas positioned in a left-down corner of each blocks of said jigsaw substrate.

6. The RFID system, as recited in claim 1, wherein said antennas positioned in a right-down corner of each blocks of said jigsaw substrate.

7. The RFID system, as recited in claim 1, wherein said position of each face of a three-dimensional jigsaw unit is a corner of each blocks of said jigsaw unit.

8. The RFID system, as recited in claim 1, wherein said tags positioned in a left-top corner of each face of a three-dimensional jigsaw unit.

9. The RFID system, as recited in claim 1, wherein said tags positioned in a right-top corner of each face of a three-dimensional jigsaw unit.

10. The RFID system, as recited in claim 1, wherein said tags positioned in a left-down corner of each face of a three-dimensional jigsaw unit.

11. The RFID system, as recited in claim 1, wherein said tags positioned in a right-down corner of each face of a three-dimensional jigsaw unit.

12. A RFID system applying to a three-dimensional jigsaw, comprising:
    a jigsaw substrate having a plurality of blocks;
    a plurality of jigsaw units corresponding to each of said blocks of said jigsaw substrate;
    a RFID reader having a plurality of antennas respectively positioned in positions of said blocks of said jigsaw substrate; and
    a plurality of tags respectively positioned in positions of faces of a three-dimensional jigsaw unit corresponding to said positions of said antennas, wherein said RFID reader communicates to said tags using modulated radio signals through said antennas and said tags respond with modulated radio signals in order to determine whether an orientation of said three-dimensional jigsaw unit is correct or not.

13. The RFID system, as recited in claim 12, wherein said position of each blocks of said jigsaw substrate is a corner of each blocks of said jigsaw substrate.

14. The RFID system, as recited in claim 12, wherein said position of each face of a three-dimensional jigsaw unit is a corner of each blocks of said jigsaw unit.

15. The RFID system, as recited in claim 12, wherein said antennas positioned in a left-top corner of each blocks of said jigsaw substrate.

16. The RFID system, as recited in claim 12, wherein said antennas positioned in a right-top corner of each blocks of said jigsaw substrate.

17. The RFID system, as recited in claim 12, wherein said antennas positioned in a left-down corner of each blocks of said jigsaw substrate.

18. The RFID system, as recited in claim 12, wherein said antennas positioned in a right-down corner of each blocks of said jigsaw substrate.

19. The RFID system, as recited in claim 12, wherein said tags positioned in a left-top corner of each face of a three-dimensional jigsaw unit.

20. The RFID system, as recited in claim 12, wherein said tags positioned in a right-top corner of each face of a three-dimensional jigsaw unit.

* * * * *

UNITED STATES PATENT AND TRADEMARK OFFICE
CERTIFICATE OF CORRECTION

PATENT NO. : 7,218,230 B1  Page 1 of 1
APPLICATION NO. : 11/118212
DATED : May 15, 2007
INVENTOR(S) : Che-Ming Wu and Tien-Fa Hou It is certified that error appears in the above-identified patent and that said Letters Patent is hereby corrected as shown below:

On the title page, item [75] should read:
(75) Inventors: Che-Ming Wu, HsinChu (TW); Tien-Fa Hou, HsinChu (TW)

Signed and Sealed this

Fourth Day of December, 2007

JON W. DUDAS
*Director of the United States Patent and Trademark Office*